US009275553B2

(12) United States Patent
Toland

(10) Patent No.: US 9,275,553 B2
(45) Date of Patent: Mar. 1, 2016

(54) PNEUMATICALLY SUPPORTED SPATIAL ATTITUDE SIMULATOR

(76) Inventor: Lance Toland, Griffin, GA (US)

( * ) Notice: Subject to any disclaimer, the term of this patent is extended or adjusted under 35 U.S.C. 154(b) by 558 days.

(21) Appl. No.: 13/438,587

(22) Filed: Apr. 3, 2012

(65) Prior Publication Data

US 2013/0260343 A1    Oct. 3, 2013

(51) Int. Cl.
*G09B 9/12*    (2006.01)
(52) U.S. Cl.
CPC ........................................ *G09B 9/12* (2013.01)
(58) Field of Classification Search
USPC .................................... 434/29, 30, 35, 45, 55
See application file for complete search history.

(56) References Cited

U.S. PATENT DOCUMENTS

| | | | |
|---|---|---|---|
| 1,825,462 A * | 9/1931 | Link, Jr. ............................ 434/55 |
| 3,164,911 A * | 1/1965 | Vaughen .......................... 434/33 |
| 3,496,650 A | 8/1967 | Kimball et al. |
| 3,983,640 A | 10/1976 | Cardullo et al. |
| 4,487,410 A | 12/1984 | Sassak |
| 4,545,574 A | 10/1985 | Sassak |
| 5,678,999 A | 10/1997 | Cicare |
| 6,629,896 B2 | 10/2003 | Jones |
| 7,428,939 B1 * | 9/2008 | Ducote ........................ 180/116 |
| 2001/0041326 A1 | 11/2001 | Zeier |

FOREIGN PATENT DOCUMENTS

EP    0 301 851    2/1989
NL    9000722    10/1991

* cited by examiner

*Primary Examiner* — Sam Yao
*Assistant Examiner* — Evan Page
(74) *Attorney, Agent, or Firm* — Michael C. Cesarano, P.A.

(57) ABSTRACT

A flight simulator rests on a plurality of air cushions as a hovercraft and assumes spatial attitudes depending upon the relative heights of the air cushions. Flight controls determine the volume of air supplied to each air cushion and thereby control the pitch and roll attitudes of the flight simulator. The simulator may be connected to an external support frame and may thereby be subjected to longitudinal, lateral, and rotational movements.

10 Claims, 7 Drawing Sheets

PNEUMATICALLY SUPPORTED SPATIAL ATTITUDE SIMULATOR

BACKGROUND

Spatial attitude simulators provide a working environment for the training of individuals whose jobs may require them to perform while in unusual spatial attitudes. Foremost amongst these are flight attitude simulators which are used to train pilots to fly aircraft that may be in any number of spatial attitudes during flight. Flight simulators have been known and used for many years, and generally require elaborate hydraulic, mechanical, and electrical actuation and control systems. The machinery and hardware used in traditional flight simulators requires extensive installation and setup, often including below-deck piping and wiring, and demand a high level of maintenance to keep them operating smoothly. For these reasons, flight simulators are expensive to acquire and maintain, and lack the portability that may be desirable for use in rural environments in which flight training facilities are few and far between. What is needed is a flight simulator that is inexpensive to acquire, easy to install and maintain, and that is portable with a minimum of activity required for setup and breakdown, and that may be stored for transport in small truck-sized bundles.

SUMMARY OF THE INVENTION

The pneumatically supported spatial attitude simulator of this invention is a flight simulator platform resting on a pneumatic air cushion that is constantly refreshed from a blower pump that supplies air to provide the cushion ("a hovercraft base"). In a manner similar to a hovercraft, air is pumped into an air cavities surrounded by a skirt. Hovercraft have existed since at least the 1950s, and are primarily used as transports that may travel laterally over a variety of diverse terrains. In this invention, however, the hovercraft base supporting the flight simulator does not traverse laterally, but simply raises or lowers as air pressure within any of a number of air cavities increases or decreases. A flight simulator cockpit supported by the hovercraft base will exhibit pitch upward or downward, and roll to the right or left, as air is directed to one or another of the supporting air cavities comprising the cushion. Direction, deflection, and diversion of the air supply can be accomplished using any number of control systems having different working components and media. Such systems include, but are not limited to, controllers using hydraulics, electrical, and mechanical air valve actuators. Such systems are in widespread use in actual aircraft, and their operation is well-known in the art of aircraft control systems. In the simulator of this invention, any of those controllers would be suitable to actuate air valves and diverters that would direct high pressure air into any one, or a plurality, of air chambers as desired to cause the responsive mechanical movement of the flight simulator cockpit.

In an embodiment of the invention, the simulator may be connected to stationary points (anchors) within its local environment, and may use those stationary points to induce lateral, longitudinal, and rotational movements to the simulator. The stationary points may be integral to the local environment, such as bulkhead or concrete floor anchors in a building, or may be a self-contained frame that is part of the simulator system. In the self-contained embodiment, the simulator may be harnessed to the anchor points with hydraulically or electrically actuated pistons and flexible straps that may also be expandable, such as bungee cords. Lateral or longitudinal movement of the simulator may be produced by elongating adjacent pistons and shortening opposing pistons. Rotational movement may be caused by elongating diametrically oppositely situated pistons while shortening adjacent pistons. The use of bungee cords to connect pistons to the simulator allows the simulator to experience pitch or roll attitudes caused by the hovercraft base while simultaneously undergoing rotational or lateral movement caused by external pistons and bungee cord connectors.

In a preferred embodiment of the invention, a simple mechanical controller attached to the "control stick" or "yoke" of the simulator operates a valve system that directs air into one or another of the segmented air chambers. In order to achieve the desired pitch and roll movements for a flight simulator, a minimum of three air chambers is recommended, although any number of air chambers greater than two can be used to achieve any desired spatial attitude. A preferred embodiment having a four-chambered system may be advantageous for simplicity of concept and installation, as each air chamber is situated beneath, and directly affects the positioning of the "nose," the "tail," or the "right" or "left" wing. As such, installation and setup can be completed by moderately skilled personnel, and control systems for a four-chambered system are straightforward in being coordinated to a simulator's control stick or yoke. For example, in a four-chambered system, movement fore and aft on the control stick or yoke will directly modify the airflow into air chambers in front of or behind the cockpit, while a right or left movement will direct airflow into the left or right air chambers. In addition, a four-chambered system embodiment may be particularly well suited to use a mechanical or hydraulic controller as the valves for diverting air into specific chambers may be in direct communication with the control stick or yoke.

Conversely, embodiments having an odd number of chambers will require greater complexity in a controller in order to translate stick or yoke movements into appropriate air valve openings. In such embodiments, electronic, or "fly-by-wire" systems may be incorporated, and can perform the coordinated valve movements required to achieve appropriate movement of the simulator cockpit by proportionately directing air into a plurality of chambers simultaneously. Thus, while the invention is primarily illustrated and discussed in terms of a four-chambered embodiment, it is not limited to that embodiment, and multi-chambered embodiments using hydraulic, electronic, or other control systems known in the art are included within the concept of the pneumatically actuated spatial attitude simulator of this invention.

In a four-chambered system, as air from the blower is directed into an air chamber, the valve system prevents or reduces air from being blown into the directly opposite chamber. Thus, if air is directed into a forward air chamber, and is shut off from flowing into the rear chamber, the simulator will experience a "nose-up" pitching movement. Similarly, if air is directed into a right-side chamber, and is reduced or eliminated from flowing into a left-side chamber, the simulator will experience a "left bank" rolling movement.

Attitude changes in the flight simulator of this invention are caused by differences in air pressure that develop as air escapes from beneath a skirt that surrounds the segmented air chambers that comprise the system. As air is constantly flowing from a blower, and is directed into all chambers as is dictated by the valve positioning, air pressure within a chamber into which less air is being directed will be reduced as air escapes, and that chamber will partially collapse until the air pressure is approximately equal to pressures elsewhere in the system. When a chamber collapses, the simulator will "tip" in that direction, producing the change in cabin attitude that results from movement of the controls. Conversely, when more air is directed into a chamber, the air pressure in that chamber will be increased, and a greater volume of air escaping beneath the skirt will cause that chamber to rise, relative to the surface upon which the simulator is resting, causing the cockpit attitude to "tip" away from that air chamber. When the control stick is centered, or neutralized, air will be directed equally into all air chambers, and the simulator will assume a neutral orientation with all air chambers being inflated to an equal height above the resting surface.

The flight simulator of this invention has few moving parts, and may be constructed from flexible and semi-flexible materials that are able to be folded and stored in a relatively small volume. The only external resource required to operate the flight simulator is electricity to power the blower that provides a constant supply of air for the system. The same characteristics of simplicity of installation and operation provide a portability that is not available in the large and complex simulators of the prior art. The relative simplicity of moving parts, and the use of inexpensive materials contribute to provide a flight simulator that is relatively inexpensive to acquire, simple to assemble, and that exhibits a range of motion and movement that is the equal of flight simulators found in the prior art.

While the flight simulator depicted and explained herein is shown with a simple, mechanical controller, other more elaborate controllers that may be electronic, hydraulic, or mechanical, are equally capable of controlling the air valves used to direct air to the proper air chambers, and may be suitable for permanent or semi-permanent installations.

DETAILED DESCRIPTION OF THE PREFERRED EMBODIMENTS

Figure 1:
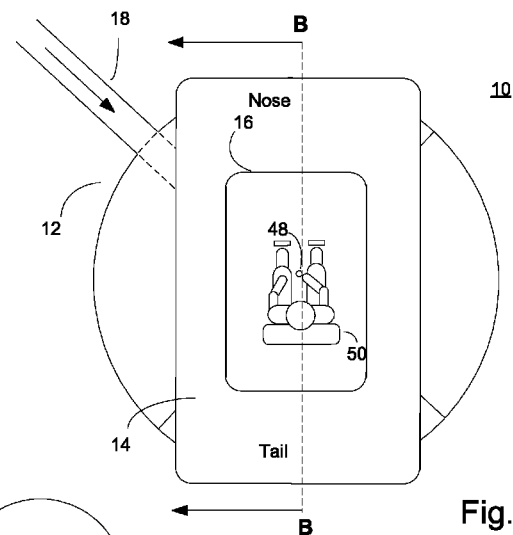
FIG. 1 is an overhead view of the invention showing the arrangement of the components.

An overhead view of the simulator 10 of this invention is depicted in FIG. 1. An air inlet 18 from a blower (not shown) provides a constant stream of air to be distributed among a plurality of air chambers to support the simulator. A plurality of chambers are combined to form a base component 12. The simulator body 14 rests upon the base component and includes a cockpit 16. The cockpit has a control stick 48 extending vertically between an operator's knees, and a seat 50 that may be adjusted as necessary for an operator (pilot) to be comfortably seated while reaching the rudder pedals 52 and the control stick 48. In some embodiments, a control yoke, such as is commonly found on commercial airliners and other civil aircraft, may be substituted for the control stick. In embodiments in which the physical movement of the control stick is mechanically translated into valve positions for directing air into the air chambers, the basic fore and aft movements of a yoke are identical to those of a control stick in controlling aircraft attitude, and the right-left movement of a control stick can be replicated with a simple mechanical interface in the simulator. In other embodiments that use electrical or hydraulic systems to detect control stick movements and translate them into valve positioning, appropriate movement sensors and actuators are well-known in the art.

Figure 2:
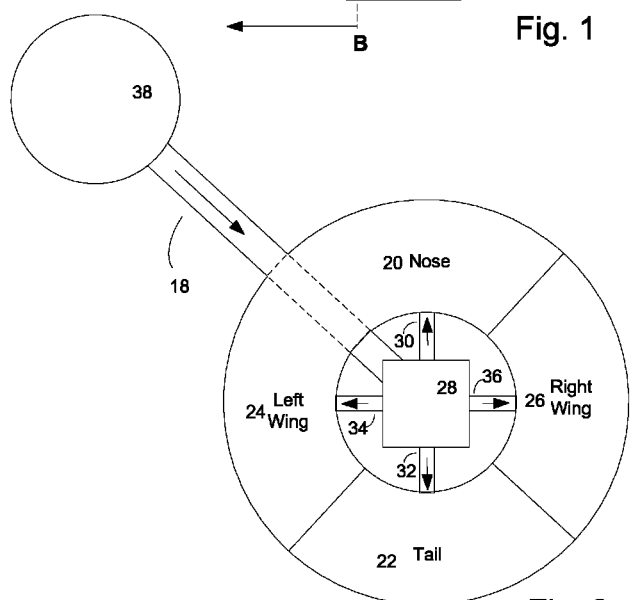
FIG. 2 is an overhead view of the lower portion of the invention with the simulator cockpit removed.

FIG. 2 shows the base component 12 with the simulator body 14 removed. Air chamber 20 is directly under the "nose" of the simulator body 14, while air chamber 22 is directly below the "tail" of the simulator body 14. Air chamber 26 is beneath the right "wing" of simulator body 14, while air chamber 24 is beneath the left "wing." Air from blower 38 comes through air inlet 18 and enters controller box 28 where, depending upon the internal positioning of valves within controller box 28, air is directed in varying amounts into air chambers 20, 22, 24 and 26 through internal pipes 30, 32, 34 and 36, respectively.

Figure 3:
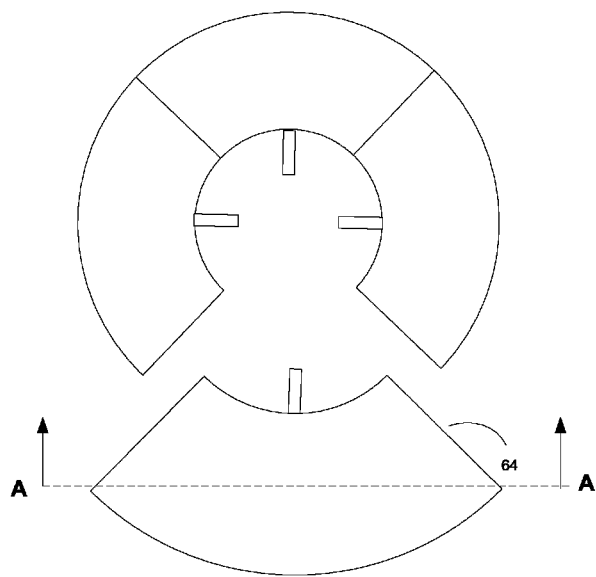
FIG. 3 shows a four-chambered embodiment of the base in which one chamber is disconnected from the others.

FIG. 3 depicts an embodiment of the base of the simulator having four air chambers. In an embodiment, each chamber is pneumatically separate from the other chambers other than the air inlet that connects each chamber to the controller box. When the simulator is disassembled, each air cushion may be separately packed, stored, or transported independently.

Figure 4:
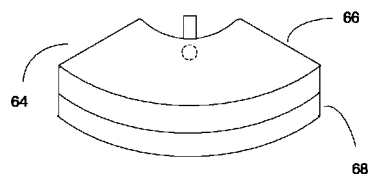
FIG. 4 is a perspective view of an individual air chamber.
Figure 5:
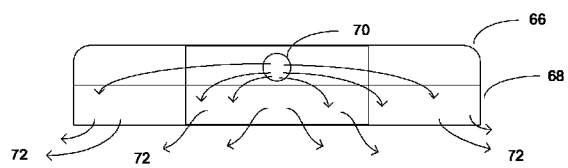
FIG. 5 is a front sectional view of the air chamber of FIG. 3 taken along section line A-A.

FIG. 4 is a perspective view of a single air chamber 64. The air chamber is a plenum that is open at the bottom, to allow air under pressure to escape. The exterior surface is divided into an upper surface 66, that supports the simulator cockpit, and a lower skirt, 68, that provides lift as it retains air within the plenum. As shown in FIG. 5, air enters the air chamber through an inlet 70 and circulates through the chamber, eventually exiting beneath the skirt 68. When the simulator is in operation, equal volumes of air enter each chamber, and generate equal air pressures that will hold the simulator at equal heights for all chambers as air currents 72 pass through the chamber 66 and exits beneath the skirt 68. As airflow through one chamber increases as a result of manipulation of the control stick, increased air volume will increase the air pressure within that chamber, causing the upper surface of the chamber to raise to a greater height and increasing the air exit passageway (the distance between the skirt and the floor), as air 72 exits through the passageway beneath the skirt. At the opposite chamber, the airflow will be decreased, causing a drop in air pressure that translates into a lowering of the height of the upper surface of the chamber.

Figure 6:
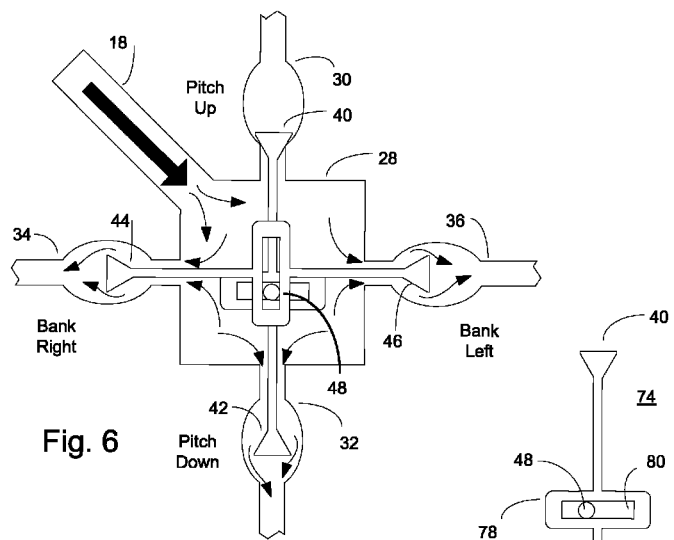
FIG. 6 depicts a detailed view of an embodiment having a mechanical controller directing air to produce a pitch down movement of the simulator.
Figure 6A:
Figure 7:
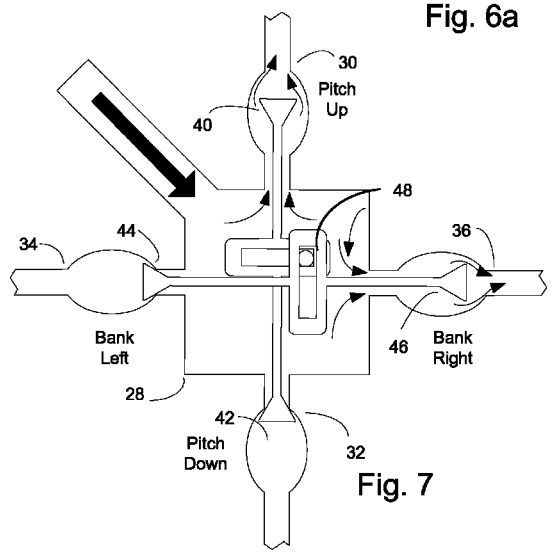
FIG. 7 shows the position of the controller of FIG. 3 when the simulator is being placed in a nose-up and bank left attitude.
Figure 8:
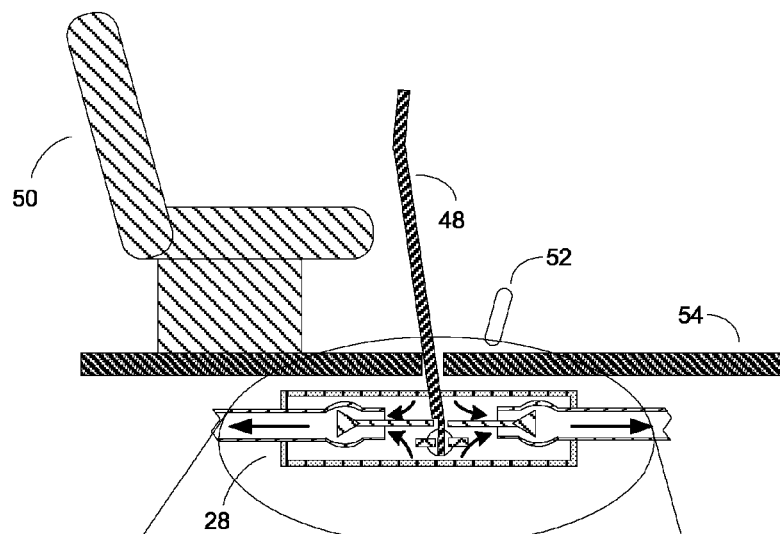
FIG. 8 diagrammatically illustrates the position of the pilot's seat, control stick, and air diversion chamber that is responsive to movements of the control stick.
Figure 9:
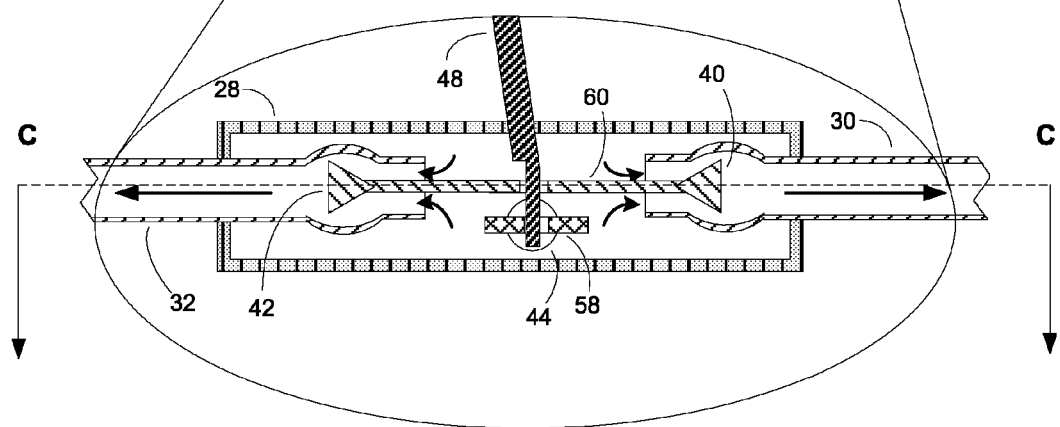
FIG. 9 provides detail of the mechanical controller that diverts air among the air chambers in response to stick movements.

FIGS. 6 and 7 depict a sectional plan view taken along line C-C of FIG. 9, showing an embodiment of a controller box 28 in which the mechanical motion of the control stick is translated into opposite valve openings and closings to cause airflow into opposite air chambers to increase or decrease. Other embodiments using hydraulic controllers or electromechanical sensors and actuators, for example, are equally suitable for the invention, and are well-known in the art. In the mechanical embodiment depicted in FIG. 6, the controller box 28 is located beneath the cockpit floor. In the embodiment depicted in FIGS. 6-9, movements of the control stick 48 within the cockpit pivot about a fulcrum located at the point where the control stick passes through the cockpit floor, causing control stick movements in the controller box to be the reverse of the movement imparted by the pilot. In FIG. 6, the control stick 46 has been moved forward in the cockpit, reflecting the pilot's decision to lower the nose of the simulator. As the control stick pivots about its fulcrum located at the floor of the cockpit, its movement is translated to a backwards motion within the controller box 28. An embodiment of a pushrod interconnect 74 between the control stick 48 and the air valves for opposing chambers is depicted in FIG. 6a. Valves 40 (nose) and 42 (tail) are located at opposite ends of pushrod 76, and simultaneously open and close air valves in opposing chambers as key ring 78 is moved forward or backward by the control stick 48 which extends through key slot 80. As can be seen, sideways right-left movement of control stick 48 will not cause fore and aft movement of the interface, while forward and backward movement of the control stick will cause valves 40 and 42 to move in a fore or aft direction, thereby simultaneously opening and closing air valves in opposing chambers. A second pushrod interconnect (not shown in FIG. 6a) situated at right angles to the first, will simultaneously open and close air valves in the other two chambers in response to right-left movements of the control stick. In this manner, movement of the control stick in any direction will produce a coordinated combination of valve openings and closings to cause incoming air to be directed into some air chambers and to restrict airflow into opposing air chambers, thus causing the simulator to be moved to various attitudes.

In FIG. 6, it can be seen that the control stick has been moved forward, but has not been moved to the right or left, thus indicating a nose-down, wings level aircraft attitude. In response to this movement, valve 40 has moved against its corresponding valve seat, closing off airflow from air inlet 18 into air pipe 30. The same movement causes valve 42 to open to a maximum, thereby permitting an increased airflow into air pipe 32. Valves 44 and 46 have not moved, as the control stick is midway between full right and full left, and air flows equally into air pipes 34 and 36. The result of this movement is to decrease airflow into chamber 20 and increase airflow into chamber 22, thus causing the nose of the simulator to pitch down while the wings are held level.

By contrast, FIG. 7 depicts a controller box configuration in which the pilot has moved control stick 48 backward and to the left, seeking a nose up and left bank aircraft attitude. In controller box 28, this movement causes the fore and aft pushrod interconnect to move forward, opening valve 40 and closing valve 42, and causes the left-right pushrod interconnect to move to the right, opening valve 46 and closing valve 44. The result is to increase airflow into chambers 20 and 26, and to reduce airflow into chambers 22 and 24, thereby giving the simulator a nose up and left bank attitude.

FIGS. 8 and 9 show a sectional view of the cockpit and controller box taken along lines B-B in FIG. 1. In FIG. 8, the cockpit seat 50 and rudder pedals 52 are adjustable, and the control stick 48 extends through the floor 54 of the cockpit and into controller box 28. FIG. 9 shows controller box 28 and its components in greater detail. Valves 40 and 42 control the amount of air entering air pipes 32 and 30. Pitch pushrod interconnect 60 controls the movement of valves 40 and 42. Roll pushrod interconnect 58 is seen end on, and controls valves 44 and 46. Air pipes 30, 32, 34 and 36 have enlarged areas to house the valves, and to permit the operation of valves 40, 42, 44 and 46, respectively, as they control the flow of air into the air pipes.

Figure 10A:
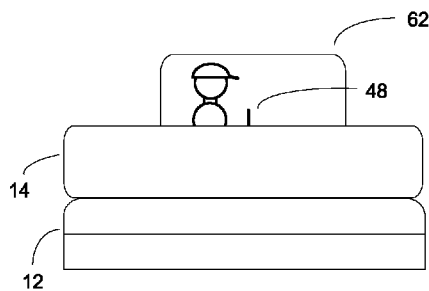
FIGS. 10a-10c show side views of attitude movements of the simulator in response to movements of the control stick.
Figure 10B:
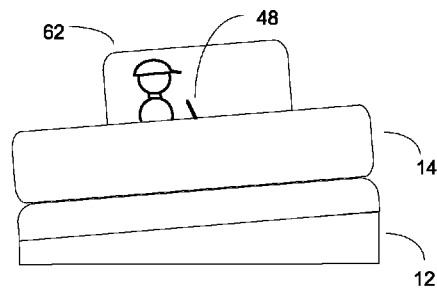
Figure 10C:
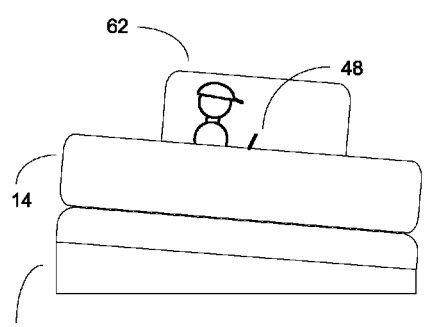

FIGS. 10a, 10b, and 10c are side views of the simulator 14 showing attitude changes in pitch as the control stick 48 is moved backward (FIG. 10b), forward (FIG. 10c), or placed in a neutral position (FIG. 10a). These attitudes are produced when the control stick's movement causes valves in the forward and rearward air chambers to open or close, causing more or less air to be deflected into those chambers. The valves may be actuated mechanically, as depicted in FIGS. 6-9, or may be hydraulically or electrically actuated valves, as are well known in the art.

Figure 11A:
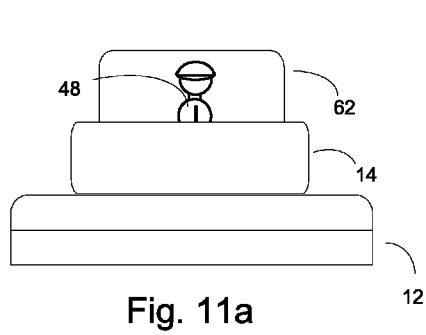
FIGS. 11a-11c show front views of attitude movements of the simulator in response to movements of the control stick.
Figure 11B:
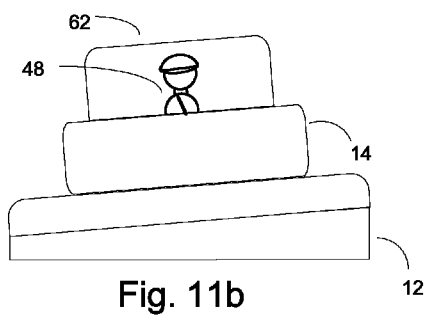
Figure 11C:
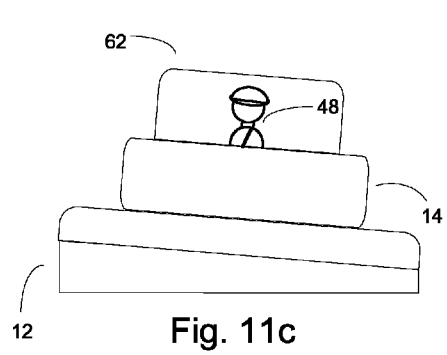

Similarly, FIGS. 11a, 11b, and 11c show front views of the simulator 14 undergoing attitude changes in roll as the control stick 48 is moved from side to side. In FIG. 11a, the control stick is centered between the pilot's knees, and the simulator's "wings" are horizontal. In FIG. 11b, the control stick has been moved to the pilot's right, and the simulator's attitude is in a right bank. FIG. 11c shows the control stick to the pilot's left, and the simulator is in a left bank. Under balanced flight conditions, such turns will produce right and left turns, respectively, and a fully instrumented simulator would indicate such turns with a compass needle moving right or left, a turn-and-bank indicator moving right of left of center, and an attitude director or artificial horizon indicating a right of left wing down attitude.

Figure 12:
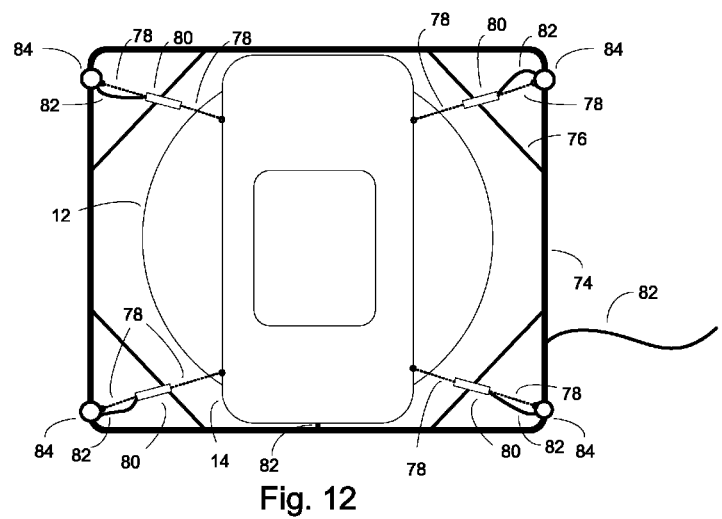
FIG. 12 is a plan view of an embodiment having an integral support frame.

FIG. 12 depicts a support frame 74 surrounding the simulator base and cockpit. In FIG. 12, the support frame 74 is shown as being roughly square or rectangular, but the specific shape is not important and the support frame can be circular, oval, or any other convenient shape. In the embodiment depicted in FIGS. 12-14, the frame rests on the ground, and four support pillars 84, roughly positioned near the corners of the simulator, extend upward to secure the bungee cord connectors 78 and pistons 80 to a stationary anchor external to the movable parts of the simulator system. Support struts 76 are provided to prevent the support frame 74 from becoming distorted when forces are applied to the frame through support pillars 84. The pistons 80 may be hydraulic, electric, or of any other suitable activation type, and are connected to a control and actuation system through lines which may be hydraulic or electric 82. Lines 82 are shown as extending from pistons 80 into support pillars 84, from whence they may be routed internally within the frame 74 to the controller box 28 (not shown in FIGS. 12-14) where rudder pedal movements may be sensed and acted upon, and to an external control panel being operated by a "flight instructor."

Figure 13:
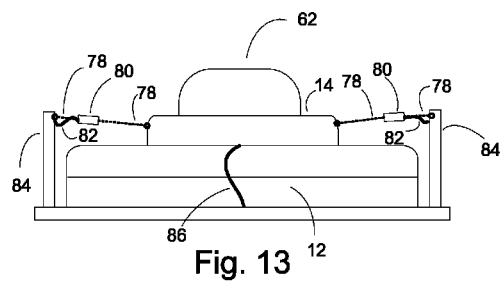
FIG. 13 is a front elevation view of the simulator of FIG. 12 showing the integral support frame.
Figure 14:
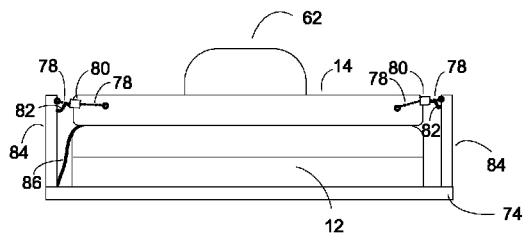
FIG. 14 is a side view of the simulator of FIG. 13.

FIG. 13 is a rear view of an embodiment of the simulator and support frame in which pistons 80 and flexible connectors 78 hold the simulator between support pillars 84. A hydraulic or electric line 86 extends from the rear of the simulator down to a lower portion of the support frame and is threaded through the frame to the support pillars 84, where it exits the frame and provides power to actuate the pistons 80. FIG. 14 is a side view of the simulator of FIG. 13 being stabilized by the support frame 74.

Figure 15:
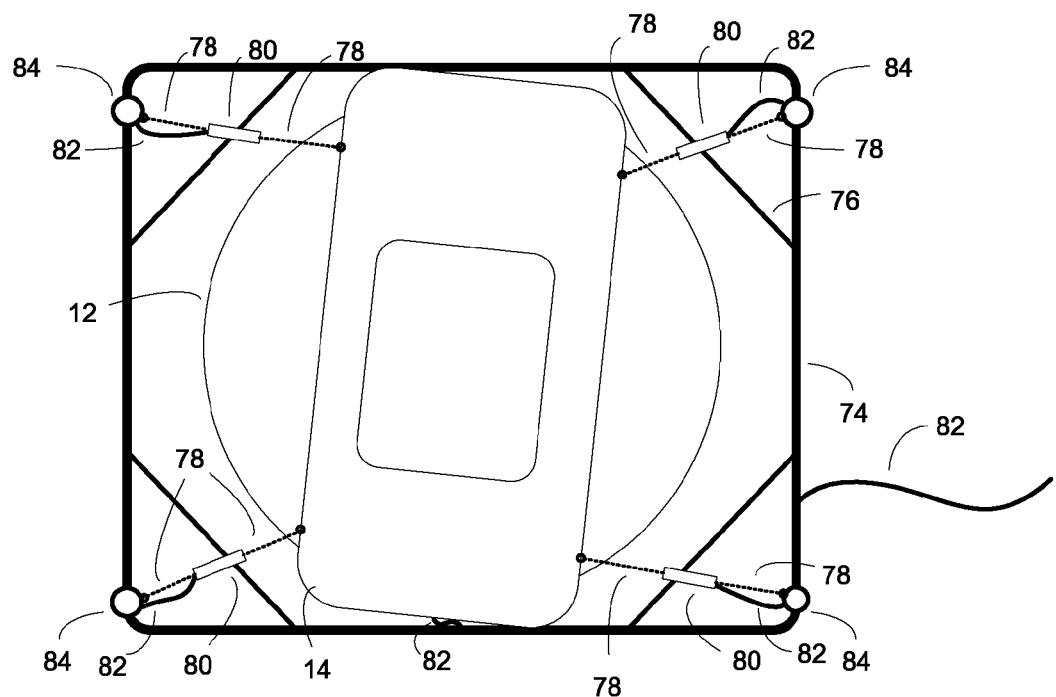
FIG. 15 is a plan view of the embodiment shown in FIG. 12 with the simulator being rotated clockwise by the action of external pistons and flexible connectors.

FIG. 15 shows how the pistons 80 and flexible connectors 78 can be actuated to cause the simulator to experience a clockwise rotation. Pistons at the upper right and lower left of FIG. 15 are compressed, while pistons at the upper left and lower right are extended to impart a rotational movement to the simulator in response to input from rudder pedals or external flight conditions. Because the simulator is support on a cushion of air, it can move rotationally without having to overcome friction, and can therefore simulate actual flight conditions. In a similar fashion, simultaneous compression of the upper left and upper right pistons, and extension of the lower left and lower right pistons, would impart a slight "forward" movement of the simulator. Simultaneous compression of the pistons at the upper and lower right sides and extension of the pistons on the left side would cause the simulator to move slightly to the right. Reversing the movements of all piston sequences described above would cause the opposite movement of the simulator.

It is to be understood that the embodiments described herein are exemplary of the simulator of this invention, and that other and further controls and movements for the simulator will occur to persons of ordinary skill in the art. Such other controls and movements are contemplated to be within the scope of the invention as described, and the scope is limited only by the appended claims and legal equivalents thereof.

I claim:

1. A pneumatically supported portable spatial attitude simulator comprising:
    a stationary simulator base further comprising a plurality of segmented and contiguously positioned flexible air chambers, each said chamber having a downward facing opening to allow an airflow entering said chamber to exit through said downward facing opening, said airflow and said downward facing opening being sufficiently large to permit said chamber to responsively lower when said airflow is decreased, and to responsively raise when said airflow in increased, in accordance with the simulated movement of an aircraft;
    a simulator body situated atop and fully supported by said simulator base, said simulator body further comprising a cockpit having a set of flight controls, said set of flight controls further comprising at least a control stick or yoke and rudder pedals;
    an air supplier for supplying said continuous, varying airflow to each of said plurality of air chambers sufficient to support said simulator body on said simulator base such that by increasing or decreasing the airflow continuously supplied to each said air chamber, said air chamber is raised or lowered with reference to other of said air chambers;
    a controller box further comprising valves for allowing or restricting air from said air supply to enter one or more of said plurality of air chambers;
    said valves in said controller box being responsive to movements of said control stick or yoke such that the airflow flowing into a first of said air chambers will be increased while the airflow flowing into a second of said air chambers is decreased when said control stick or yoke is moved, such that a portion of said simulator body superjacent to said first air chamber will be raised while simultaneously a portion of said simulator body superjacent to said second air chamber will be lowered;
    whereby, the attitude of said simulator is responsively varied in accordance with movements of said control stick or yoke to cause said simulator to pitch up or down, and to roll right or left, and to attain an attitude having any combination of pitch and roll in response to movements of said control stick or yoke,
    said flexible chambers comprising said simulator base being foldable and portable such that said simulator body, said controller box, said air supplier and said simulator base is capable of being disassembled and transported between temporary locations.

2. The pneumatically supported spatial attitude simulator claimed in claim 1, said controller box further comprising mechanical linkages between said control stick or yoke and said valves such that forward movement of said control stick or yoke produces forward pitch of said simulator, rearward movement of said control stick or yoke produces rearward pitch of said simulator, movement of said control stick or yoke to the right produces a roll to the right of said simulator, and movement of said control stick or yoke to the left produces a roll to the left of said simulator, said movements being responsive to the degree of movement of said control stick or yoke.

3. The pneumatically supported spatial attitude simulator claimed in claim 1, said controller box further comprising hydraulic linkages between said control stick or yoke and said valves, and said simulator pitches up or down and rolls right or left in response to movements of said control stick or yoke.

4. The pneumatically supported spatial attitude simulator claimed in claim 1, said controller box further comprising electronic sensors on said control stick or yoke and electronic valve actuators on said valves, whereby said simulator pitches up or down and rolls right or left in response to movements of said control stick or yoke.

5. The pneumatically supported spatial attitude simulator claimed in claim 1, further comprising a support frame, said support frame extending substantially around said simulator and comprising a plurality of flexible connectors and pistons whereby selective actuation of one or more of said pistons causes said simulator to move laterally or longitudinally or rotationally or any combination thereof.

6. The pneumatically supported spatial attitude simulator claimed in claim 5, further comprising said plurality of pistons being activated selectively in response to movement of said rudder pedals, thereby causing said simulator to have rotational movement.

7. The pneumatically supported spatial attitude simulator claimed in claim 5, further comprising said plurality of pistons being activated selectively in response to inputs from flight controls or from an external control panel whereby said inputs cause said simulator to experience acceleration.

8. In a flight simulator having a hovercraft base comprising a plurality of contiguously positioned, pneumatically separate air chambers having air outlets and a simulator cockpit situated atop and fully supported by said plurality of air chambers, a method of simulating changes in flight attitude conditions comprising the steps of:
    continuously directing airflow into said plurality of air chambers in approximately equal amounts to produce the simulation of level flight;
    continuously directing a relatively greater airflow into one or more adjacent air chambers whereby a section of said simulator cockpit supported by said adjacent air chambers is elevated in response to said greater airflow, and another section of said simulator cockpit supported by air chambers that receive a lesser airflow is lowered in response to said lesser airflow, to produce the simulation of other than level flight.

9. A pneumatically supported portable spatial attitude simulator comprising:
    a stationary simulator base further comprising a plurality of segmented flexible air chambers, each said chamber being open at a lower end whereby air entering said chamber will cause said chamber to be elevated sufficiently for air to escape beneath said chamber;
    an air supplier for continuously supplying a quantity air to said plurality of air chambers;

a plurality of valves and valve actuators for regulating the volume of air entering each of said plurality of air chambers;

a simulator body being fully supported by said simulator base and comprising a cockpit having flight controls such that the spatial attitude of said simulator body is determined by the amount of elevation of one or more of said air chambers with respect to the elevation of other of said air chambers;

said valve actuators being responsive to movements of said flight controls such that the valves regulate the volume of air continuously flowing into each of said air chambers, thereby causing one or more of said air chambers to elevate and another one or more of said air chambers to lower in response to movements of said flight controls;

whereby, the attitude of said simulator is varied in response to movements of said control stick or yoke to cause said simulator to pitch up or down, and to roll right or left, and to attain an attitude having any combination of pitch and roll;

said portable spatial attitude simulator being able to be broken down into separate components comprising a simulator body, an air supplier, a plurality of foldable air chambers, and a plurality of valves and valve actuators such that said components is capable of being transported and installed at a plurality of sites.

10. A spatial attitude simulator as claimed in claim 9, said simulator body further comprising a simulated cockpit of an existing aircraft, said simulated cockpit replicating flight controls, visual display, instrumentation and communications as found in said existing aircraft;

said simulator body being in electronic communication with a controller, said controller receiving electrical inputs from said simulator body representing movements of flight controls, and causing valve actuators to operate valves to direct a greater volume of air into one or more of said air chambers, and to direct a lesser volume of air into one or more other of said air chambers in response to said electrical inputs;

whereby said air simulator base responds to elevation changes of said air chambers to place said simulated cockpit of an existing aircraft in spatial attitudes as directed by said flight controls, and said visual display and instrumentation provide a simulator pilot with information corresponding to said spatial attitudes.

\* \* \* \* \*